(12) United States Patent
Chen et al.

(10) Patent No.: US 12,533,853 B2
(45) Date of Patent: Jan. 27, 2026

(54) RESIN CLEANING DEVICE AND METHOD

(71) Applicant: GUANGZHOU HEYGEARS IMC. INC, Guangdong (CN)

(72) Inventors: Biao Chen, Guangdong (CN); Xin Wan, Guangdong (CN); Lijun Zuo, Guangdong (CN); Jun Hu, Guangdong (CN); Jia Yu, Guangdong (CN); Chenlai Zou, Guangdong (CN); Xiangru Su, Guangdong (CN); Shuangxi Xiao, Guangdong (CN); Yang Qu, Guangdong (CN)

(73) Assignee: GUANGZHOU HEYGEARS IMC. INC, Guangdong (CN)

( * ) Notice: Subject to any disclaimer, the term of this patent is extended or adjusted under 35 U.S.C. 154(b) by 70 days.

(21) Appl. No.: 18/401,605

(22) Filed: Dec. 31, 2023

(65) Prior Publication Data
US 2024/0131792 A1 Apr. 25, 2024
US 2024/0227298 A9 Jul. 11, 2024

Related U.S. Application Data

(63) Continuation of application No. PCT/CN2022/106579, filed on Jul. 19, 2022.

(30) Foreign Application Priority Data

Jul. 19, 2021 (CN) .......................... 202110812057.1

(51) Int. Cl.
  *B29C 64/35* (2017.01)
  *B08B 3/02* (2006.01)
  (Continued)

(52) U.S. Cl.
  CPC .............. *B29C 64/35* (2017.08); *B08B 3/022* (2013.01); *B08B 3/14* (2013.01); *B08B 15/02* (2013.01);
  (Continued)

(58) Field of Classification Search
  None
  See application file for complete search history.

(56) References Cited

U.S. PATENT DOCUMENTS

2015/0224703 A1* 8/2015 Oda .................... G03F 7/0002
                                                                  264/447

FOREIGN PATENT DOCUMENTS

| CN | 210525846 U | 5/2020 | |
|---|---|---|---|
| CN | 211071077 U * | 7/2020 | ............. B08B 3/102 |

(Continued)

OTHER PUBLICATIONS

Google Patents translation of CN211071077U (Year: 2025).*
Google Patents translation of CN212386023U (Year: 2025).*
ISR for PCT/CN2022/106579 mailed Oct. 26, 2022, 4 pages.

*Primary Examiner* — Eric W Golightly
(74) *Attorney, Agent, or Firm* — The Sun IP Law

(57) ABSTRACT

Provided is a resin cleaning device and method. The resin cleaning device includes a control system, a treatment unit, a driving unit, and a feedback assembly. The treatment unit, the driving unit, and the feedback assembly are respectively in communication connection with the control system. The treatment unit is configured for treating a member-to-be-cleaned so as to reduce a viscosity of resin on the member-to-be-cleaned. The driving unit is configured for driving the member-to-be-cleaned to rotate. The feedback assembly is configured for acquiring a position signal of the member-to-be-cleaned and feeding the position signal back to the control system, such that the control system controls the treatment unit and the driving unit according to the position signal.

7 Claims, 6 Drawing Sheets

(51) Int. Cl.
  *B08B 3/14* (2006.01)
  *B08B 15/02* (2006.01)
  *B33Y 40/20* (2020.01)
(52) U.S. Cl.
  CPC ....... *B33Y 40/20* (2020.01); *B08B 2203/0217* (2013.01)

(56) References Cited

FOREIGN PATENT DOCUMENTS

| | | |
|---|---|---|
| CN | 211467509 U | 9/2020 |
| CN | 212386023 U | 1/2021 |
| CN | 113665118 A | 11/2021 |
| JP | 2004306497 A | 11/2004 |

* cited by examiner

RESIN CLEANING DEVICE AND METHOD

CROSS-REFERENCE TO RELATED APPLICATION

The disclosure is a Continuation of the PCT International Application No. PCT/CN2022/106579 filed on Jul. 19, 2022, which claims priority to Chinese Patent Application No. 202110812057.1, filed with China National Intellectual Property Administration on Jul. 19, 2021, and entitled "RESIN CLEANING DEVICE AND METHOD, which is incorporated herein by reference in its entirety.

TECHNICAL FIELD

The disclosure relates to the technical field of resin cleaning, and more particularly relates to a resin cleaning device and method.

BACKGROUND

The 3D technology of photocuring molding is based on the characteristic of liquid photosensitive resin undergoing a polymerization reaction when exposed to ultraviolet light, and transforming from a liquid state to a solid state. According to the forming principle, an acquired three-dimensional data model is sliced in a Z-axis direction by control software according to a set layer thickness, so as to obtain cross-sectional data of each region of the three-dimensional data model. Then, an ultraviolet laser is controlled to scan a liquid surface of the liquid photosensitive resin according to the cross-sectional data, or an ultraviolet projector is controlled to project light spots in the shape of the cross-sectional data to the liquid surface of the photosensitive resin. Further, the liquid photosensitive resin scanned by the ultraviolet laser or exposed to irradiation from the ultraviolet projector undergoes a polymerization reaction, and then is solidified into a cured layer in the shape of the cross-sectional data. Then, the cured layer is adhered to a platform or a previous cured layer and is controlled by a motor to move in the Z-axis direction, leaving a position for the next cured layer operation and replenishing the photosensitive resin at this position. Further, the control software continues to receive next cross-sectional data, the ultraviolet laser or ultraviolet projector is reconfigured for scanning or irradiation, such that the photosensitive resin is polymerized and solidified according to the cross-sectional data. The above steps are cyclically performed until the photocuring molding process of the three-dimensional data model is finished.

After the photocuring molding process is finished, uncured photosensitive resin will remain on the surface of an obtained photocuring model, and therefore, in order to improve treatment efficiency, a treating agent and a treatment device are needed for thoroughly treating the model while the treatment process is not intelligent enough.

SUMMARY

Some embodiments of the disclosure provide a resin cleaning device and method, so as to solve the problem that an existing device is not intelligent enough in a treatment process.

In order to achieve the above objective, the disclosure adopts the following technical solution:

The disclosure provides a resin cleaning device, including a control system, a treatment unit, a driving unit, and a feedback assembly. The treatment unit, the driving unit, and the feedback assembly are respectively in communication connection with the control system. The treatment unit is configured for treating a member-to-be-cleaned so as to reduce a viscosity of resin on the member-to-be-cleaned. The driving unit is configured for driving the member-to-be-cleaned to rotate. The feedback assembly is configured for acquiring a position signal of the member-to-be-cleaned and feeding the position signal back to the control system, such that the control system controls the treatment unit and the driving unit according to the position signal.

The disclosure further provides a resin cleaning method. The resin cleaning method is based on the above resin cleaning device. The resin cleaning method includes: S10: driving the member-to-be-cleaned to centrifugally rotate; S20: acquiring the position signal of the member-to-be-cleaned; and S30: treating the member-to-be-cleaned based on the position signal so as to reduce the viscosity of the resin on the member-to-be-cleaned.

The disclosure further provides a resin cleaning device, including:
 a control system;
 a treatment assembly, including a treatment unit and a driving unit, where the treatment unit is provided with an accommodating chamber for accommodating a member-to-be-cleaned, the member-to-be-cleaned is connected with the driving unit, and/or, the treatment unit is connected with the driving unit, the driving unit is in communication connection with the control system, and the treatment unit is configured for reducing a viscosity of resin on the member-to-be-cleaned; and
 a feedback assembly, configured to acquire a position signal of the member-to-be-cleaned and feed the position signal back to the control system.

Compared with the prior art, the solution of the disclosure has the beneficial effects: in the disclosure, the driving unit is able to be controlled by the control system to drive the member-to-be-cleaned to rotate, such that most of excess resin on the member-to-be-cleaned is shaken off; then, under the effect of the feedback assembly, the control system intelligently adjusts the position of the member-to-be-cleaned; and after the treatment unit performs corresponding viscosity reduction treatment, the resin on the member-to-be-cleaned is more easily shaken off, which is beneficial for thorough treatment of the excess resin remaining on the member-to-be-cleaned, thereby achieving a more intelligent resin cleaning process with a better effect.

BRIEF DESCRIPTION OF THE DRAWINGS

To describe the technical solutions of the embodiments of the disclosure more clearly, the following briefly introduces the accompanying drawings required for describing the embodiments. Apparently, the accompanying drawings in the following description are merely some embodiments of the disclosure, and those of ordinary skill in the art may still derive other accompanying drawings from these accompanying drawings without creative efforts.

REFERENCE NUMERALS

100—control system;
200—treatment unit; 210—accommodating chamber; 220—viscosity reduction mechanism; 221—nozzle; 222—heating element; 223—vacuum pump; 224—liquid pump; 225—cleaning agent container; 226—guide rail; 227—slider; 228—hinge; 230—supporting member; 240—damping element;
300—driving unit; 310—driving assembly; 320—rotating shaft assembly; 321—rotating shaft; 322—first pulley; 323—second pulley; 324—belt; 330—fixing assembly;
400—feedback assembly; 410—trigger element; 420—sensing element;
500—collection unit; 510—drainage pipe; 520—waste liquid container;
600—curing mechanism;
700—identification reading mechanism;
001—member-to-be-cleaned; 002—printing platform; and 003—identification.

DETAILED DESCRIPTION OF THE EMBODIMENTS

The technical solutions in embodiments of the disclosure are clearly and completely described below in combination with accompanying drawings in the embodiments of the disclosure. Apparently, the described embodiments are merely some rather than all of the embodiments of the disclosure. Based on the embodiments of the disclosure, all other embodiments obtained by those of ordinary skill in the art without creative labor shall fall within the scope of protection of the disclosure.

In the photocuring 3D printing process, a three-dimensional data model is first sliced to obtain a plurality of slice layers. Then, a light source projects light to photosensitive resin according to the shape and slice thickness of the slice layers, such that the photosensitive resin is cured into cured layers corresponding to the slice layers, and the cured layers are formed on a printing platform and then are stacked layer by layer to finally obtain a three-dimensional solid model. However, it is apparent that excess resin will adhere to a surface of the printed three-dimensional solid model, and needs to be cleaned away.

Figure 1:
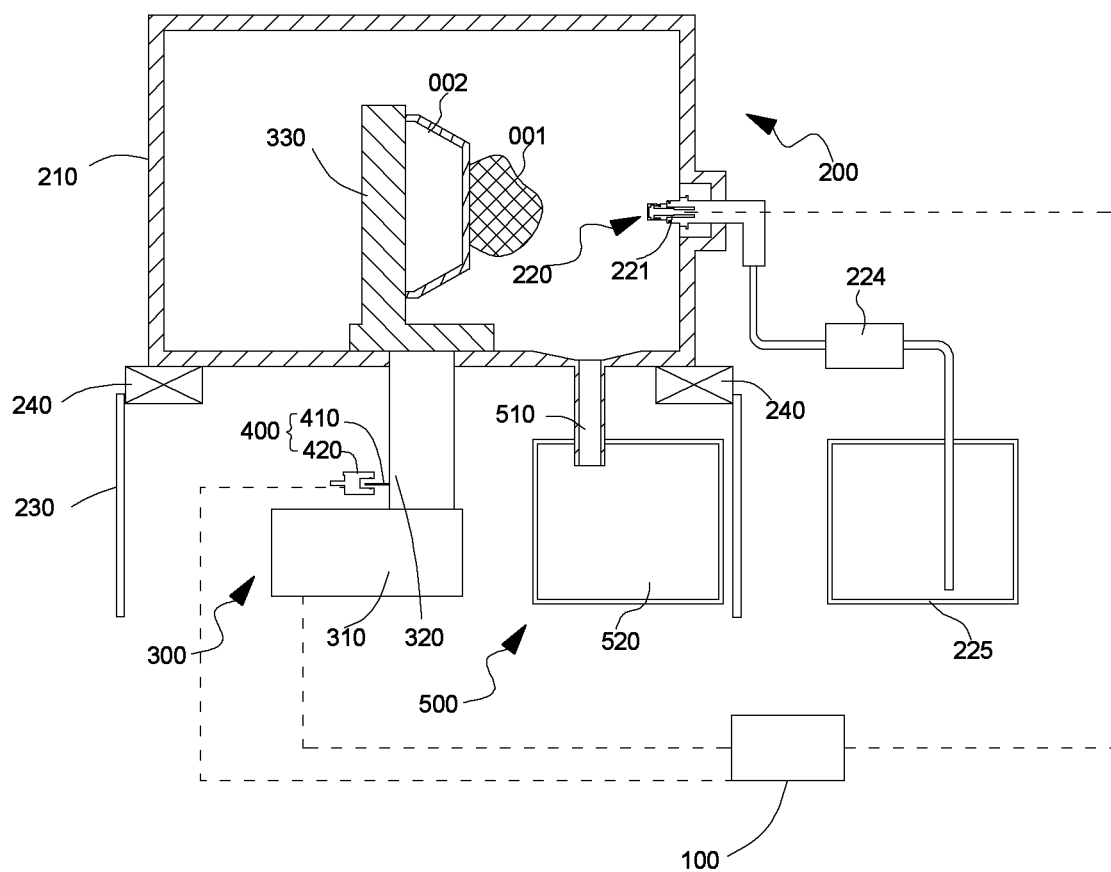
FIG. 1 is a structural schematic diagram of resin cleaning device according to an embodiment of the disclosure.
Figure 2:
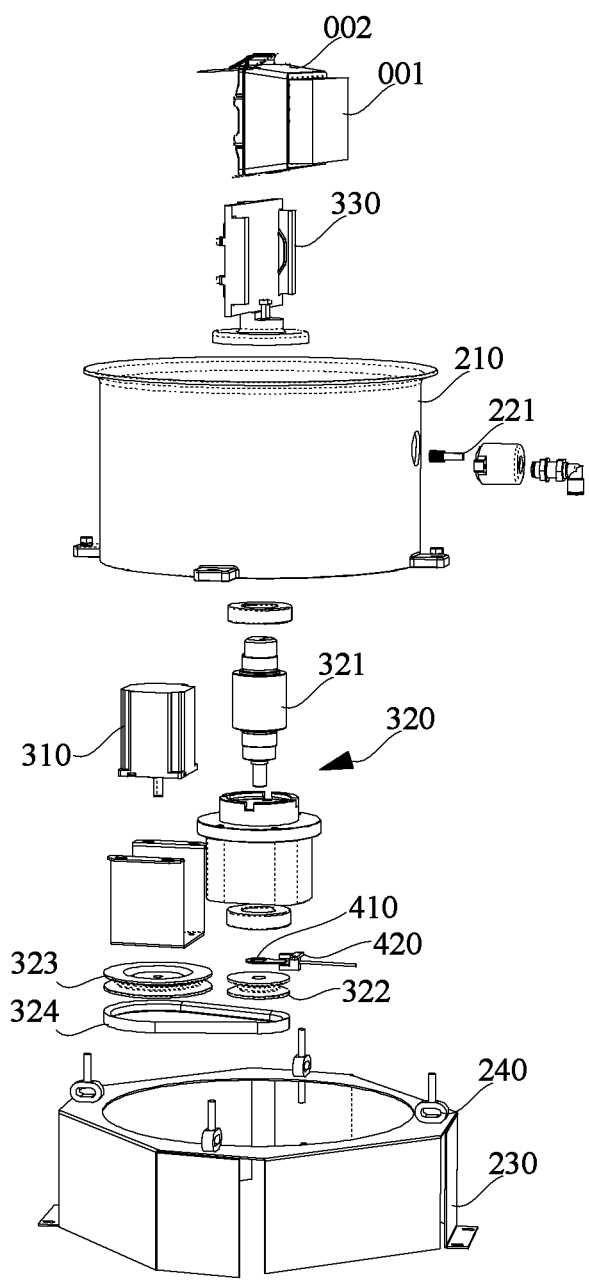
FIG. 2 is an exploded view of resin cleaning device according to an embodiment of the disclosure.

As shown in FIG. 1 and FIG. 2, the disclosure provides a resin cleaning device, configured for cleaning away excess resin on a surface of a three-dimensional solid model (i.e., a member-to-be-cleaned 001) obtained through 3D printing. The resin cleaning device includes a control system 100, a treatment unit 200, a driving unit 300, and a feedback assembly 400, where the control system 100 is respectively in communication connection with the treatment unit 200, the driving unit 300, and the feedback assembly 400. In some application scenarios, the treatment unit 200 and the driving unit 300 in the resin cleaning device are components of a treatment assembly, and are matched with each other to clean away the resin on the member-to-be-cleaned.

Specifically, the control system 100 stores related control programs to control operations of the treatment unit 200 and the driving unit 300. The treatment unit 200 is controlled by the control system 100 to treat the excess resin on the surface of the member-to-be-cleaned 001, thereby reducing the viscosity of the excess resin. The driving unit 300 is controlled by the control system 100 to drive the member-to-be-cleaned 001 to rotate so as to cooperatively remove the resin on the surface of the member-to-be-cleaned 001. The feedback assembly 400 is configured to acquire a position signal of the member-to-be-cleaned 001 and feed the signal back to the control system 100, such that the control system 100 controls the treatment unit 200 and the driving unit 300 according to the position signal.

Specifically, when the member-to-be-cleaned 001 is driven by the driving unit 300 to rotate, at least part of material such as the resin adhering to the surface of the member-to-be-cleaned 001 is shaken off.

In addition, when the treatment unit 200 reduces the resin viscosity of the member-to-be-cleaned 001, for example, the treatment unit 200 reduces the resin viscosity in a manner of spraying a cleaning agent to the member-to-be-cleaned 001, because the member-to-be-cleaned 001 may not always be located in a spraying area in each direction, the control system 100 acquires the position signal of the member-to-be-cleaned 001 through the feedback assembly 400, and then accurately controls, by the driving unit 300, a rotating position of the member-to-be-cleaned 001, such that the cleaning agent sprayed by the treatment unit 200 is sufficiently and pointedly sprayed to the surface of the member-to-be-cleaned 001, the resin viscosity is reduced through at least one of manners such as a chemical reaction, dissolving, and diluting, and the member-to-be-cleaned 001 is further driven by the driving unit 300 to rotate so as to shake off the viscosity-reduced resin and the cleaning agent, thereby improving the resin removing efficiency.

Specifically, the feedback assembly 400 includes a trigger element 410 and a sensing element 420. The sensing element 420 is in communication connection with the control system 100, and has a trigger station. The trigger element 410 is connected with the driving unit 300, and is driven by the driving unit 300 to rotate relative to the sensing element 420. When the trigger element 410 is matched with the trigger station, the sensing element 420 feeds the position signal of the member-to-be-cleaned 001 to the control system 100.

It is to be noted that, in the disclosure, when the trigger element 410 is matched with the trigger station, the member-to-be-cleaned 001 is set to be located at an optimal position where the treatment unit 200 reduces the viscosity of the member-to-be-cleaned 001, and in this case, the control system 100 controls the driving unit 300 to stop driving, such that the member-to-be-cleaned 001 stops at the optimal position so as to be treated by the treatment unit 200. Certainly, the optimal position may also not be a location of the member-to-be-cleaned 001 when the trigger element 410 is matched with the trigger station, and in this case, after the control system 100 receives the position signal fed back by the feedback assembly 400, the driving unit 300 is controlled to drive the member-to-be-cleaned 001 to a corresponding optimal position.

Specifically, the trigger element 410 is connected to the driving unit 300 or the treatment unit 200, is arranged in a horizontal direction and/or a vertical direction of an accommodating chamber 210, and is driven by the driving unit 300 to rotate relative to the sensing element 420, which specifically synchronously rotates together with the member-to-be-cleaned 001. The trigger element 410 includes but not limited to a sensing plate, and when the trigger element 410 is matched with the sensing element 420, the sensing element 420 is triggered to work.

The sensing element 420 is in communication connection with the control system 100 and is provided with the trigger station matched with the trigger element 410 in a rotating direction of the trigger element 410 or the sensing element 420. When the trigger element 410 rotates to be matched with the trigger station, the sensing element 420 feeds the position signal of the member-to-be-cleaned 001 to the control system 100. The sensing element 420 includes but not limited to a photoelectric switch, and works in a principle that an object-to-be-detected shields or reflects a light beam, allowing electrical conduction through a synchronous circuit, thereby detecting the presence or absence of the object-to-be-detected.

Further, in an application scenario, the trigger element 410 is driven by the driving unit 300 to rotate in a circumferential direction of the accommodating chamber 210, and the sensing element 420 is installed on the accommodating chamber 210; and in another application scenario, the sensing element 420 is installed on the driving unit 300 while the trigger element 410 is installed on the accommodating chamber 210, which is not specifically limited herein.

In the above manner, the control system 100 controls the driving unit 300 to drive the member-to-be-cleaned 001 to rotate in the circumferential direction, such that most of the excess resin on the member-to-be-cleaned 001 is shaken off; and then, under cooperation of the treatment unit 200, the trigger element 410, and the sensing element 420, the excess resin remaining on the member-to-be-cleaned 001 is thoroughly removed, thereby achieving a more intelligent resin cleaning method.

The inventors have discovered in design that a technology of cleaning by an ultrasonic cleaning machine is adopted in related technologies, in which the member-to-be-cleaned 001 and the cleaning agent are arranged in a container and then placed in the ultrasonic cleaning machine, and by utilizing the cavitation effect of the ultrasonic cleaning machine, the resin on the surface of the member-to-be-cleaned 001 is rapidly peeled off and dissolved by the cleaning agent, thereby thoroughly cleaning the member-to-be-cleaned 001. The ultrasonic cleaning technology is high in cleaning speed and mature, but consumes a large number of cleaning agents. However, in a scenario where a cleaning agent meeting the requirement for cleanliness is utilized in a medical field, the cleaning agent cannot be reused, resulting in a waste in cleaning agent. In addition, after the model is completely cleaned, an air gun is further configured for blowing dry the cleaning agent on the surface of the member-to-be-cleaned 001.

In view of this, as shown in FIG. 1, when the resin is removed, the member-to-be-cleaned 001 is fixed to the driving unit 300. Specifically, the member-to-be-cleaned 001 is connected with the driving unit 300, and/or, the member-to-be-cleaned 001 is installed on the treatment unit 200 while the treatment unit 200 is connected with the driving unit 300.

Exemplarily, the treatment unit 200 includes an accommodating chamber 210 configured for accommodating the member-to-be-cleaned 001, such that the treatment unit 200 removes the excess resin on the member-to-be-cleaned 001. The driving unit 300 is configured for driving the member-to-be-cleaned 001 to rotate in the circumferential direction of the treatment unit 200 so as to perform a centrifuge operation on the member-to-be-cleaned 001, thereby conveniently shaking off the excess resin on the member-to-be-cleaned 001 and achieving a better cleaning effect.

It is to be understood that in another embodiment, the driving unit 300 is also configured for driving the treatment unit 200 to rotate in a circumferential direction of the member-to-be-cleaned 001, which may be specifically selected according to actual situations and is not limited herein.

Further, the member-to-be-cleaned 001 is also driven by the driving unit 300 to do a differential motion and a forward and reverse rotation, such that working modes of the resin cleaning device are diverse. Alternatively, when the driving unit 300 drives the member-to-be-cleaned 001 to oscillate, the resin at corners is shaken off by adopting a variable speed method. For example, after acceleration/deceleration, a constant speed is maintained to facilitate cleaning of the corners of the member-to-be-cleaned 001. In addition, the working mode of the resin cleaning device may be designed specifically for the type of the member-to-be-cleaned 001; and as long as the treatment unit 200 can clean the member-to-be-cleaned 001, which still falls within the scope of protection of the disclosure.

In an embodiment, the driving unit 300 includes a driving assembly 310, a rotating shaft assembly 320, and a fixing assembly 330. One end of the rotating shaft assembly 320 is connected with the driving assembly 310, and the other end of the rotating shaft assembly 310 is connected with the fixing assembly 330. The rotating shaft assembly 320 is driven by the driving assembly 310 to rotate so as to drive the member-to-be-cleaned 001 fixed to the fixing assembly 330 to rotate.

Exemplarily, the driving assembly 310 includes but not limited to a motor. The motor drives the rotating shaft assembly 320 so as to drives the member-to-be-cleaned 001 to do a circular motion and perform a reciprocating circular motion within a certain angle range. An output end of the driving assembly 310 is arranged in a vertical direction of the treatment unit 200. The driving assembly 310 is able to be located inside or outside the accommodating chamber 210. The rotating shaft assembly 320 is able to be located inside or outside the accommodating chamber 210. It is to be understood that when the driving assembly 310 is a servo motor, the feedback assembly 400 is an internal encoder of the servo motor.

In an embodiment, when the member-to-be-cleaned 001 is fixed to the resin cleaning device, a vertical centerline of the member-to-be-cleaned 001 may or may not coincide with a rotational axis of the rotating shaft assembly 320, and as long as the member-to-be-cleaned 001 rotates by the driving assembly 310, which still falls within the scope of protection of the disclosure. When the position of the member-to-be-cleaned 001 arranged in the resin cleaning device is not symmetrically designed based on the rotational axis of the rotating shaft assembly 320, for example, to reduce the size of the resin device, when the resin cleaning device removes the resin of only one member-to-be-cleaned 001, in order to prevent the resin from swinging, the vertical centerline of the member-to-be-cleaned 001 coincides with the rotational axis of the rotating shaft assembly 320. In other embodiments, a center of gravity of the member-to-be-cleaned 001 is located near or coincides with the rotational axis of the rotating shaft assembly 320. In other words, a center of gravity of the fixing assembly 330 deviates a certain distance from the rotational axis of the rotating shaft assembly 320, which ensures that after the member-to-be-cleaned is placed in the resin cleaning device, the vertical centerline or center of gravity of an overall structure composed of the member-to-be-cleaned 001 and the fixing assembly 330 coincides with the rotational axis of the rotating shaft assembly 320.

It is to be understood that in the 3D printing process, a printed object is formed by layer-by-layer adhesion on the printing platform 002. Therefore, the member-to-be-cleaned 001 obtained through 3D printing is bonded to the printing platform 002. In the related technologies, the member-to-be-cleaned 001 needs to be first taken down from the printing platform 002, and then cleaned. In the disclosure, the printing platform 002 is a disposable platform. After printing is completed, the printing platform 001 and the member-to-be-cleaned 001 are subjected to posttreatment together, and are separated at an appropriate stage in the subsequent process. In another embodiment, the printing platform 002 may also not be the disposable platform, and the printing platform 002 may be reusable.

In some embodiments, the member-to-be-cleaned 001 is connected to the printing platform 002. When cleaning is performed by the resin cleaning device, the printing platform 002 is fixed to the fixing assembly 330, thereby fixing the member-to-be-cleaned 001. In this embodiment, the member-to-be-cleaned 001 is located on one side of the printing platform 002 away from the fixing assembly 330, and the printing platform 002 is connected with the member-to-be-cleaned 001. A vertical centerline of the fixing assembly 330 is located on one side of the vertical centerline (i.e., a rotational axis) of the rotating shaft assembly 320, and a vertical centerline of the member-to-be-cleaned 001 is located on the other side of a vertical centerline of the rotating shaft assembly 320. By arranging the fixing assembly 330 on one side of the rotating shaft assembly 320 and arranging the member-to-be-cleaned 001 on the other side of the rotating shaft assembly 320, namely, by adopting an asymmetric structure design, the size of the resin cleaning device is effectively reduced, and meanwhile the problem of eccentric vibration is solved.

If the member-to-be-cleaned 001 is directly fixed to the fixing assembly 330, the risk of damaging the member-to-be-cleaned by the fixing assembly 330 may exist, and a fixed position is difficult to clean. In the above embodiment, the manner of fixing the printing platform 002 to the fixing assembly 330 can solve the problem. Moreover, the printing platform is a disposable component, which may be discarded later, and therefore, it is acceptable even when the printing platform 002 is damaged to some extent during connection to the fixing assembly 330.

In the disclosure, the driving assembly 310 drives, by the rotating shaft assembly 320, the member-to-be-cleaned 001 to do the circular motion, which is beneficial for removing the excess resin from the member-to-be-cleaned 001.

In another embodiment, the rotating shaft assembly 320 includes a rotating shaft 321, a first pulley 322 sleeving the rotating shaft 321, and a second pulley 323 sleeving the driving assembly 310. The first pulley 322 is connected with the second pulley 323 through a belt 324.

Exemplarily, the rotating shaft 321 is arranged in the vertical direction of the treatment unit 200, and the rotating shaft 321 and the driving assembly 310 are distributed left and right. The first pulley 322 is arranged at a lower end of the rotating shaft 321, and the fixing assembly 330 is arranged at an upper end of the rotating shaft 321. Under driving of the driving assembly 310, the member-to-be-cleaned 001 is driven by the rotating shaft assembly 320 and the fixing assembly 330 to rotate, thereby removing the excess resin from the periphery of the member-to-be-cleaned 001.

The inventors have discovered that in the related technologies, a magnetic stirring cleaning technology is adopted, in which the member-to-be-cleaned 001, the cleaning agent, and a magnet are placed in a container and then placed on a magnetic stirrer. By utilizing a rotating magnetic field of the magnetic stirrer, the magnet is driven to rotate at a high speed, and in this case, the magnet drives the cleaning agent to flow rapidly and flush photosensitive resin on the surface of the member-to-be-cleaned 001, so as to enable the resin to be rapidly peeled off and dissolved by the cleaning agent, thereby thoroughly cleaning the member-to-be-cleaned 001. The cleaning speed of the magnetic stirring technology is generally moderate, and the technology is mature and low in cost, but consumes a large number of cleaning agents, and in the medical field with a high requirement for the cleanliness of the cleaning agent, the cleaning agent cannot be reused, resulting in a significant waste of the cleaning agent. After the member-to-be-cleaned 001 is cleaned, the air gun is required to blow dry the cleaning agent on the surface of the member-to-be-cleaned 001.

Figure 3:
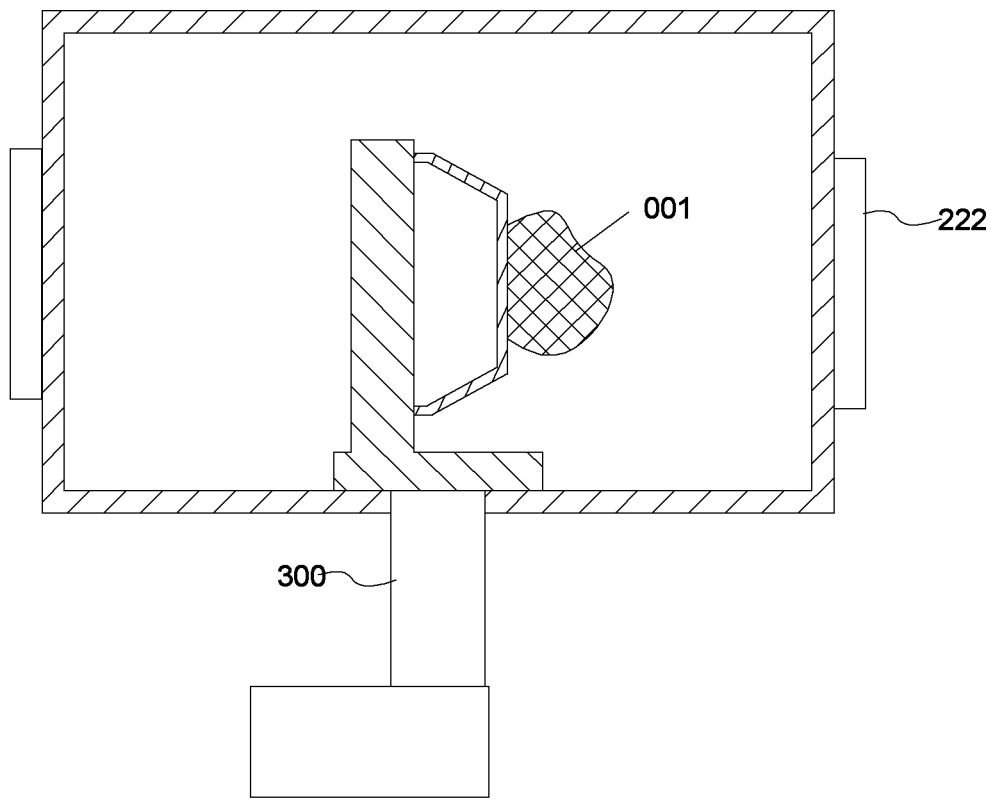
FIG. 3 is a structural schematic diagram of resin cleaning device according to an embodiment of the disclosure.
Figure 4:
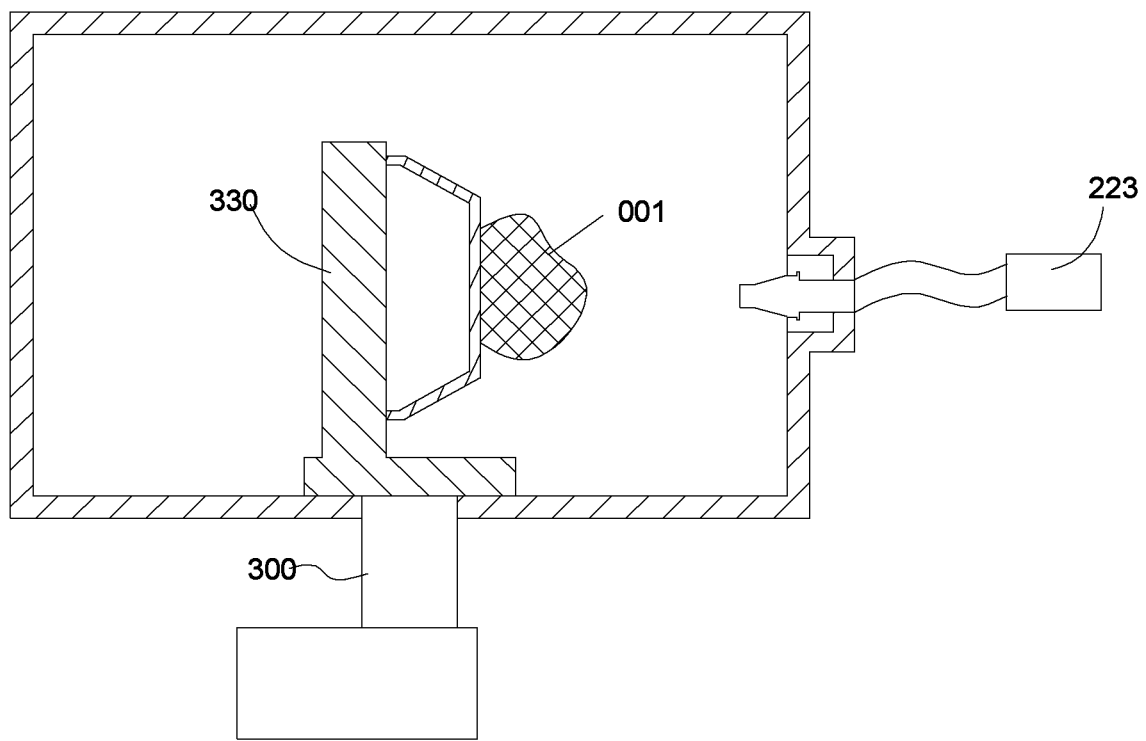
FIG. 4 is a structural schematic diagram of resin cleaning device according to an embodiment of the disclosure.

In the disclosure, the treatment unit 200 further includes a viscosity reduction mechanism 220. The viscosity reduction mechanism 220 includes at least one of a nozzle 221 for spraying the cleaning agent, a heating element 222 (refer to FIG. 3) for heating the member-to-be-cleaned 001, and a vacuum pump 223 (refer to FIG. 4) for creating a vacuum state for the member-to-be-cleaned 001. The heating element 222 is selected from a hot air blower, a resistive heating element, and a heating tube, which is not limited by the disclosure, as long as the heating element 222 may effectively heat the member-to-be-cleaned 001.

In an embodiment, the viscosity reduction mechanism 220 includes a nozzle 221, a liquid pump 224 connected with the nozzle 221, and a cleaning agent container 225 for supplying the cleaning agent. The cleaning agent container 225 is arranged on an outer side of the treatment unit 200. One end of the liquid pump 224 is communicated with the cleaning agent container 225 through a pipeline, and the other end of the liquid pump 224 is communicated with the nozzle 221 through a pipeline. At least part of the nozzle 221 is located in the accommodating chamber 210 and is configured for extracting the cleaning agent from the cleaning agent container 225 through the liquid pump 224, and spraying the cleaning agent to the member-to-be-cleaned 001.

It is to be noted that the nozzle 221 is fixedly connected to the accommodating chamber 210, or rotationally connected to the accommodating chamber 210, which allows the nozzle 221 to conveniently perform spraying treatment on different members-to-be-cleaned 001, thereby achieving a wider applicability.

Figure 5:
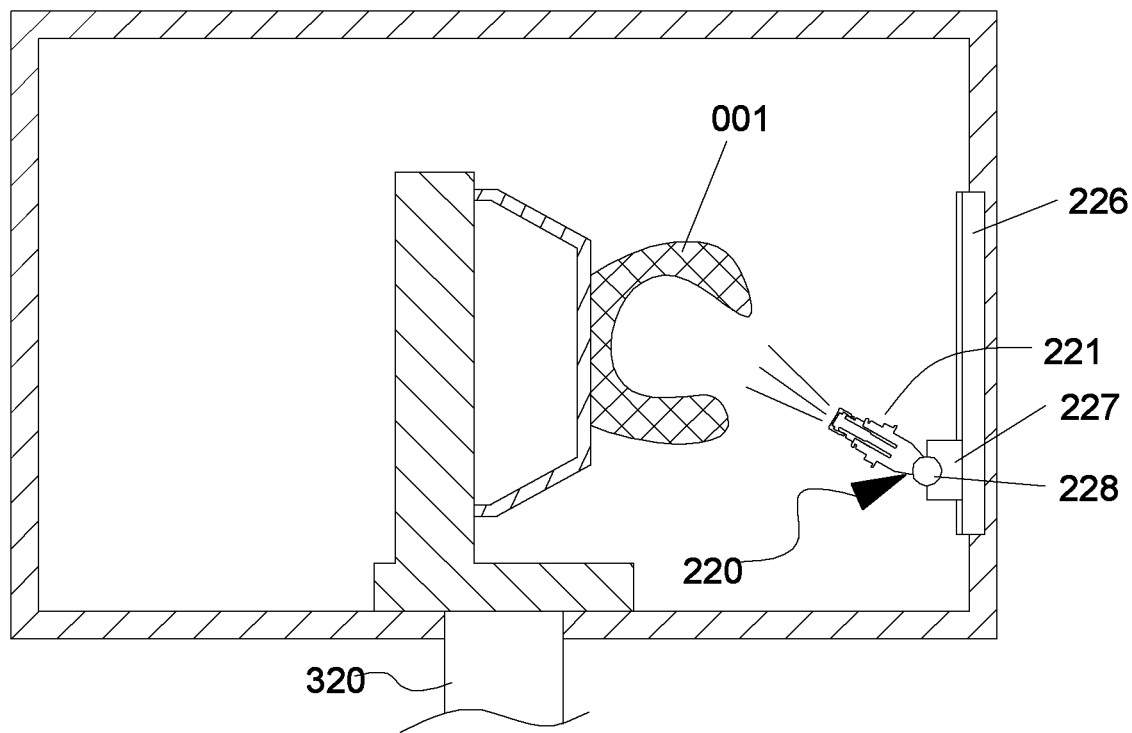
FIG. 5 is a top view of resin cleaning device according to an embodiment of the disclosure.

Specifically, please refer to FIG. 5, the viscosity reduction mechanism 220 further includes a guide rail 226, a slider 227, and a hinge 228. The guide rail 226 is arranged on a side wall of the accommodating chamber 210 and arranged in the vertical direction of the accommodating chamber 210. The slider 227 is slidably connected to the guide rail 226, and may slide along the guide rail 226 through guidance. The nozzle 221 is hinged to the slider 227 through the hinge 228, thereby realizing the angle and position adjustment of the nozzle 221, and facilitating spraying onto difficult-to-clean areas of the member-to-be-cleaned 001 (e.g., parts with inverted shapes or corners).

Position adjustment parameters for adjusting the position, angle, etc. of the nozzle 221 are set according to a digital three-dimensional model of the member-to-be-cleaned 001. For example, preprocessing software configured for 3D printing is configured for identifying a difficult-to-clean area in the digital three-dimensional model. Specific to the area, a movement path of the nozzle 221 and/or the member-to-be-cleaned 001 is automatically calculated, and is converted into the position adjustment parameters for the nozzle 221 so as to correspondingly control the position of the nozzle 221 on the guide rail 226, the angle position of the nozzle 221, and the rotational position of the member-to-be-cleaned 001 relative to the nozzle 221, thereby making the resin cleaning device more intelligent. The position adjustment parameters may be used as one of control parameters of the resin cleaning device, and have a corresponding relationship with the unique ID of the member-to-be-cleaned 001.

In an embodiment, when the trigger element 410 is located at the trigger station, the nozzle 221 is arranged towards the member-to-be-cleaned 001, and the nozzle 221 starts working. When the trigger element 410 is misaligned with the trigger station by a certain angle, the nozzle 221 stops spraying onto the member-to-be-cleaned 001. The spraying operation not is limited to a single occurrence. In order to achieve more thorough cleaning, the control system 100 drives the member-to-be-cleaned 001 back to the trigger station based on the feedback assembly 400, multi-time cleaning on the member-to-be-cleaned 001 is performed, and the position of the nozzle 221 is even aligned with the difficult-to-clean area on the member-to-be-cleaned 001, and the member-to-be-cleaned 001 stops rotating within a preset time, allowing the nozzle 221 to perform a targeted spraying operation. It is to be understood that the preset dwell time is adopted as one of the control parameters of the resin cleaning device, thereby reducing the waste of a cleaning agent, ensuring thorough spraying onto the member-to-be-cleaned 001, and making the resin cleaning device more targeted and intelligent.

In the disclosure, the viscosity reduction mechanism 220 is configured for spraying the cleaning agent onto the member-to-be-cleaned 001 after high-speed centrifugal rotation, thereby making the surface of the member-to-be-cleaned 001 cleaner. The viscosity reduction mechanism 220 is controlled by the control system 100 so as to be more intelligent. The viscosity reduction mechanism 220 in the disclosure is configured for cleaning different members-to-be-cleaned 001 without causing cross-contamination between materials.

In an embodiment, a user can directly input corresponding control parameters on an operation interface of the removal device, or select the application type for the current member-to-be-cleaned 001. Different application types have corresponding control parameters in a database for the resin cleaning device, the control parameters are mainly configured for controlling the treatment unit 200 and the driving unit 300. The control parameters include but not limited to a centrifugal rotation speed and a centrifugal rotation time for driving the member-to-be-cleaned 001 to rotate by the driving unit 300, working parameters of the treatment unit 200, etc.

It is to be understood that the structure of the treatment unit 200 determines the type of the working parameters of the treatment unit 200. In an embodiment, the treatment unit 200 includes a viscosity reduction mechanism 220. The viscosity reduction mechanism 220 is configured for performing the operation, under the control of the control system 100, that reduces the viscosity of the resin on the member-to-be-cleaned 001. In an application scenario, the viscosity reduction mechanism 220 includes a nozzle 221 for spraying a solvent, and in this case, the working parameters of the treatment unit 200 include spraying time of a cleaning agent, a spraying pressure of the cleaning agent, etc. In another application scenario, the viscosity reduction mechanism 220 includes a heating element 222 for heating the member-to-be-cleaned 001, and in this case, the working parameters of the treatment unit 200 include a heating duration, a heating temperature, a heating power, etc. In another application scenario, the viscosity reduction mechanism 220 includes a vacuum pump 223 for creating a vacuum state for the member-to-be-cleaned 001, and in this case, the working parameters of the treatment unit 200 include a pressure intensity, a vacuum duration, etc.

It is to be understood that the control parameters are automatically input through the interconnection between the resin cleaning device and a printer. Specifically, the user may set a corresponding printing process and control parameters of the resin cleaning device before printing. Prior to starting printing, the printing process and the control parameters of the resin cleaning device may be sent to the printer and the resin cleaning device through a wired or wireless connection method (e.g., wifi, Bluetooth, and network). Printing steps and cleaning steps are continuous, and after the printer finishes printing, the member-to-be-cleaned 001 is directly placed into the treatment unit 200, and the treatment unit 200 may automatically perform a resin cleaning operation after recognizing the member-to-be-cleaned 001, achieving an intelligent operation.

Figure 6:
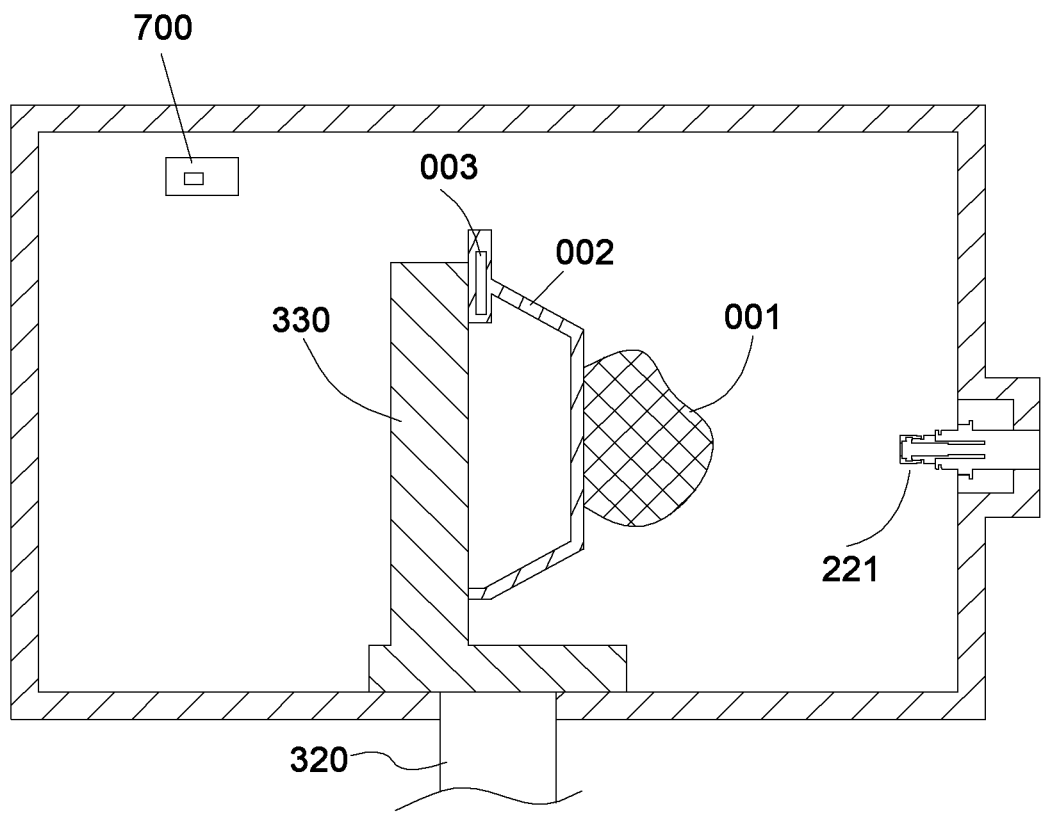
FIG. 6 is a structural schematic diagram of resin cleaning device according to an embodiment of the disclosure.

To achieve a more intelligent design, please refer to FIG. 6, in another embodiment, the accommodating chamber 210 is provided with an identification reading mechanism 700, such as a reader or a code scanning unit. The printing platform 002 is provided with a unique ID (i.e., identification 003). The unique ID is configured for associating the member-to-be-cleaned 001 with the control parameters. The unique ID may be a matrix code (e.g., a two-dimension code and barcode), an electronic tag (radio frequency identification (RFID) or near-field communication (NFC)), and the identification 003 such as identification codes including but not limited to contents such as numbers, letters, and texts. Certainly, the matrix code or identification code is also directly formed on the member-to-be-cleaned 001. Prior to operations of the resin cleaning device, the ID may be read by the reader to match and obtain the corresponding control parameters of the member-to-be-cleaned 001.

In an embodiment, continue to refer to FIG. 1 and FIG. 2, the treatment unit 200 further includes a supporting member 230 connected with the accommodating chamber 210. Exemplarily, the accommodating chamber 210 and the supporting member 230 is distributed from top to bottom, or is also distributed in other ways, for example, the supporting member 230 is arranged on an outer side surface of the accommodating chamber 210. In terms of shape, the accommodating chamber 210 and the supporting member 230 all are set to be cylindrical, and certainly, may be in another shape, such as square, which is not specifically limited herein.

In an embodiment, the treatment unit 200 further includes a damping element 240 arranged between the accommodating chamber 210 and the supporting member 230. At least one damping element 240 is arranged and is distributed on peripheries of the supporting member 230. When there are two or more damping elements 240, the two adjacent damping elements 240 are arranged in a spaced manner.

Exemplarily, the damping element 240 includes but not limited to a rubber pad, a shock-absorbing pad, a spring, etc., and is configured for damping between the accommodating chamber 210 and the supporting member 230.

By utilizing the damping element 240, vibration generated during the operation between the accommodating chamber 210 and the supporting member 230 is reduced, and the fit degree and working stability of the accommodating chamber 210 and the supporting member 230 are improved.

Figure 7:
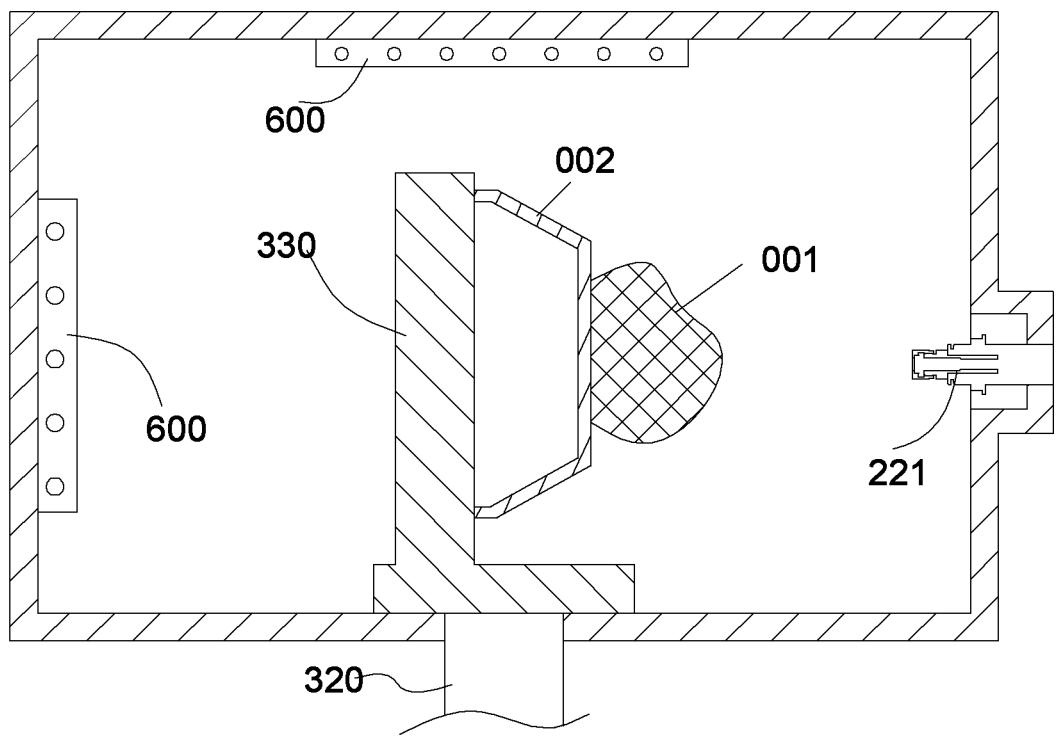
FIG. 7 is a structural schematic diagram of resin cleaning device according to an embodiment of the disclosure.

Further, as shown in FIG. 7, the treatment unit 200 further includes a curing mechanism 600. The curing mechanism 600 is arranged on the periphery of the accommodating chamber 210, corresponds to the member-to-be-cleaned 001, and is configured for performing curing treatment on the member-to-be-cleaned 001.

The type of the curing mechanism 600 is set according to the material type. Exemplarily, the curing mechanism 600 includes but not limited to an ultraviolet (UV) curing lamp, a thermal curing unit, a heating element, etc. In this embodiment, the curing mechanism 600 is the UV curing lamp. After the viscosity reduction mechanism 220 cleans the member-to-be-cleaned 001, the curing mechanism 600 is turned on to perform post-curing on the member-to-be-cleaned 001. It is to be understood that the control system 100 obtains the position signal of the member-to-be-cleaned 001 through the feedback assembly 400, so as to precisely control the rotational position of the member-to-be-cleaned 001 by using the driving unit 300, ensuring that the member-to-be-cleaned 001 is located at an optimal curing position. The curing mechanism 600 performs a thorough post-curing operation on the member-to-be-cleaned 001, making the post-curing operation more intelligent.

As shown in FIG. 1, the resin cleaning device further includes a collection unit 500. A part of a bottom of the accommodating chamber 210 is set as a recessed portion, and the collection unit 500 is communicated with the recessed portion.

Exemplarily, the collection unit 500 includes a drainage pipe 510 and a waste liquid container 520 connected with the drainage pipe 510. The waste liquid container 520 is arranged outside the accommodating chamber 210, and is configured for collecting liquid such as the cleaning agent and remaining resin which is shaken off. Further, waste liquid collected by the collection unit 500 may also be treated by a certain cleaning method, thereby obtaining a reusable cleaning agent.

Further, the disclosure further provides a resin cleaning method. It is to be noted that the resin cleaning method in this embodiment may be implemented based on the resin cleaning device described above, and may specifically include the following steps:

S10: Driving a member-to-be-cleaned 001 to centrifugally rotate.

When resin on the member-to-be-cleaned 001 is removed, a driving unit 300 is first controlled to drive the member-to-be-cleaned 001 to centrifugally rotate for the first time. In this case, the resin on the surface of the member-to-be-cleaned 001 is not mixed with a cleaning agent, and is high in viscosity with excess resin remaining. By high-speed centrifugal rotation, most of the resin on the surface of the member-to-be-cleaned 001 may be shaken off, thereby making the cleaning agent more easily dissolved and the resin more easily peeled off from the surface of the member-to-be-cleaned 001.

S20: Acquiring a position signal of the member-to-be-cleaned 001.

As mentioned above, when the member-to-be-cleaned 001 is driven to rotate, the member-to-be-cleaned 001 may not always be located in a spraying area in each direction, and therefore, in order to achieve effective cleaning, the position of the member-to-be-cleaned 001 is first determined, thereby further performing viscosity reduction treatment based on the position.

The position signal of the member-to-be-cleaned 001 may be obtained by manners such as obtaining the rotation turns of the driving unit 300 or the rotation angle of the member-to-be-cleaned 001.

Exemplarily, the control system 100 obtains the rotation turns through cooperation of the trigger element 410 and the sensing element 420 of the resin cleaning device, which is not repeated herein, as described in the previous embodiments of the resin cleaning device. The rotation angle of the member-to-be-cleaned 001 is obtained by setting a camera on the treatment unit 200 to capture the rotation state of the member-to-be-cleaned 001.

S30: Treating the member-to-be-cleaned 001 based on the position signal so as to reduce a viscosity of resin on the member-to-be-cleaned 001.

In addition to the spraying the cleaning agent onto the member-to-be-cleaned 001, creating the vacuum state for the member-to-be-cleaned 001, and heating the member-to-be-cleaned 001 as mentioned in the foregoing embodiments, corresponding physical scrubbing may be performed by the cleaning agent on the member-to-be-cleaned 001 by manners rinsing, brushing, centrifuging, bubbling, swirling, ultrasonic processing, and stirring, which may be specifically selected according to actual demands.

In this embodiment, the treatment unit 200 performs spraying treatment on the member-to-be-cleaned 001 by the nozzle 221. During the spraying treatment, the member-to-be-cleaned 001 is in a relatively static state, and is also driven by the driving unit 300 to oscillate left and right relative to the nozzle 221, performing a differential motion and/or forward and reverse rotation, etc, thereby fully spraying the cleaning agent onto the surface of the member-to-be-cleaned 001, maximizing the cleaning efficiency of the cleaning agent, and meanwhile saving spraying time and the usage amount of the cleaning agent.

It is to be noted that in the disclosure, the optimal spraying position for the member-to-be-cleaned 001 is determined based on the acquired position signal. For example, the location of the member-to-be-cleaned 001 when the position signal is acquired is set as the optimal position. In this case, the control system 100 controls the driving unit 300 to stop driving, allowing the member-to-be-cleaned 001 to stop at the optimal position for spraying. Certainly, the optimal position may also not be the location of the member-to-be-cleaned 001 when the position signal is acquired, and in this case, after receiving the position signal, the control system 100 controls the driving unit 300 to drive the member-to-be-cleaned 001 to a corresponding optimal position.

Figure 8:
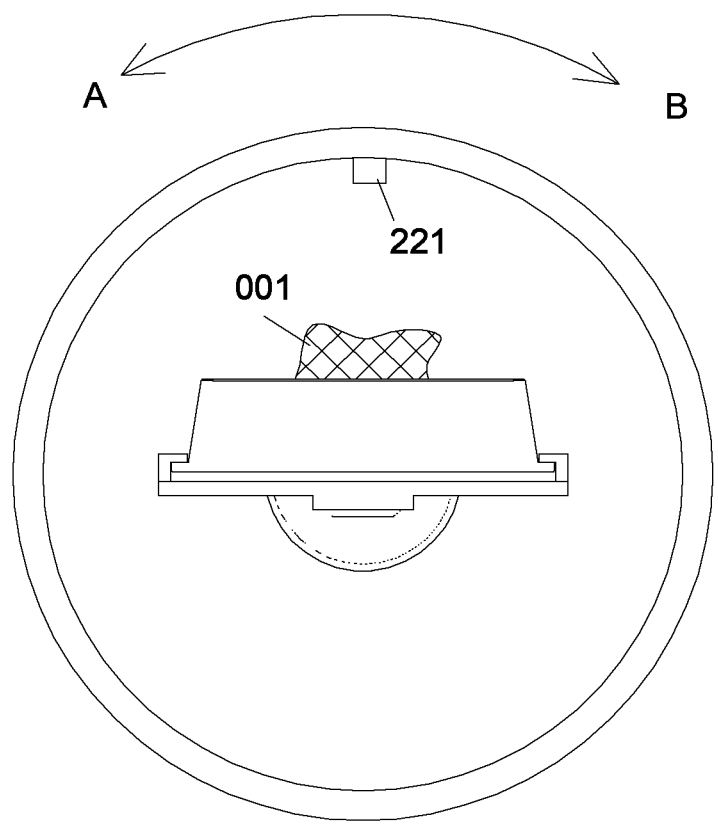
FIG. 8 is a structural schematic diagram of resin cleaning device according to an embodiment of the disclosure.

As shown in FIG. 8, during spraying, the member-to-be-cleaned 001 rotates relative to the nozzle 221 only in an A direction or B direction, or can oscillate back and forth in both the A and B directions to improve the spraying effect.

S40: Cyclically performing steps S10 to S30 for R times according to a preset centrifugal rotation cycle number R of the member-to-be-cleaned 001.

Exemplarily, different numbers of times of centrifugal rotations and spraying cycles are set according to different shapes, sizes, etc. of the members-to-be-cleaned 001, thereby satisfying the cleaning requirement. Specifically, the control system 100 can first control the driving unit 300 to perform the first-time centrifugal rotation on the member-to-be-cleaned 001 to shake off the resin on the surface of the member-to-be-cleaned 001, and then, controls the nozzle 221 to perform spraying treatment on the member-to-be-cleaned 001. If the cycle number is greater than 1, the centrifugal rotation and spraying continue, and during this cycle, the cleaning agent on the surface of the member-to-be-cleaned 001 may be spun dry, and the resin on the surface of the member-to-be-cleaned 001 is further centrifugally shaken off. Correspondingly, the cycle number is decreased by 1 to become R−1 after each cycle operation until the cycle number is not greater than 1, and in this case, the control system 100 can end the cycle operation by control.

When the cycle number is equal to 1, the control system 100 controls the driving unit 300 to drive the member-to-be-cleaned 001 to centrifugally rotate, so as to shake off the last-sprayed cleaning agent on the surface of the member-to-be-cleaned 001, which ensures the cleanliness of the surface of the member-to-be-cleaned 001 without any resin or cleaning agent residue. In addition, the entire resin removal process is completed by controlling the nozzle 221 and the driving unit 300 to stop working.

Exemplarily, after the resin cleaning device is started, the control system 100 automatically obtains the control parameters, including but not limited to a rotation speed, an initial rotation duration, a cyclic rotation duration, reverse rotation activation or inactivation, cycle number of centrifugal rotation+spray, a spin-dry rotation duration, a spray duration, etc. The rotation speed refers to the rotation speed of the driving unit 300 during the centrifugal rotation, including rotation speeds of an initial high-speed centrifugal rotation, a cyclic rotation, and a spin-dry rotation. The initial rotation duration refers to the motion duration of the driving unit 300 at the rotation speed of r during the first-time centrifugal rotation, and in this case, the resin on the surface of the member-to-be-cleaned 001 is not mixed with the cleaning agent and has high viscosity, which requires a longer rotation duration s. The cyclic rotation duration refers to the motion duration of the driving unit 300 at the rotation speed of r during the centrifugal rotation, excluding the first-time centrifugal rotation, and in this case, the resin on the surface of the member-to-be-cleaned 001 is mixed with the cleaning agent and has lower viscosity, and therefore, the rotation duration x may be shorter relative to s. The reverse rotation activation or inactivation means that during the centrifugal rotation, excluding the first-time centrifugal rotation, the rotating direction of the driving unit 300 is opposite to the previous rotating direction, creating an alternating mode of forward rotation, reverse rotation, forward rotation, and reverse rotation for the centrifugal rotation, which ensures the maximized efficiency of the centrifugal rotation. The cycle number of centrifugal rotation+spray refers to the total number R of centrifugal rotations (including the initial rotation). The spin-dry rotation duration refers to the rotation duration of the driving unit 300 to shake off the last-sprayed cleaning agent from the surface of the member-to-be-cleaned 001, ensuring the cleanliness of the surface of the member-to-be-cleaned 001 without any resin or cleaning agent residue. The spray duration refers to the duration of spraying the cleaning agent onto the member-to-be-cleaned 001 after each centrifugal rotation.

In the above embodiment, the efficiency of resin removal is effectively improved through centrifugal rotation and resin viscosity reduction. By precisely controlling the position of the member-to-be-cleaned 001, the cleaning operation of the member-to-be-cleaned 001 becomes more intelligent.

It is to be noted that in the embodiment in which the viscosity reduction mechanism includes the nozzle, and the nozzle is configured for spraying the cleaning agent onto the member-to-be-cleaned to realize viscosity reduction, the cleaning agent sprayed by the nozzle is an organic cleaning agent or an inorganic cleaning agent.

It is to be noted that photocurable resins for 3D printing include waterborne resin and solvent-based resin (i.e., hydrophilic resin and hydrophobic resin). The waterborne resin, such as waterborne polyurethane acrylate, with molecules containing a certain number of hydrophilic groups and unsaturated groups, make the waterborne resin hydrophilic and water-soluble. In the related technologies, when components obtained by means of 3D printing are cleaned by the waterborne resin, water or aqueous solution may be directly configured for cleaning. The solvent-based resin, such as UV polyether acrylate, is typically hydrophobic and typically can only be dissolved by organic solvent, rather than water, and therefore, thorough cleaning is difficult by directly using the water. Therefore, in the related technologies, when the components obtained rby means of 3D printing are cleaned by the solvent-based resin, organic solvent such as alcohol and isopropanol are often used, instead of the water or aqueous solution. However, when the organic solvent is configured for cleaning, a large quantity is often required, which results in high cost. In addition, the organic solvent are highly irritating, and significant safety hazards exist during usage and storage of alcohol and other flammable and combustible reagents.

In order to solve the above technical problems, the inventors of the disclosure creatively utilize an aqueous solution of an alkaline inorganic compound for cleaning the solvent-based resin on the surface of a 3D printed component, thereby reducing or avoiding the use of the organic solvent.

Specifically, the cleaning agent sprayed by the nozzle in the disclosure includes water and an alkaline inorganic compound.

It is to be noted that a main component of 3D printing raw material, such as photocurable 3D printing resins, is ester. The cleaning agent provided in the disclosure achieves the cleaning purpose through the saponification reaction between OH— in the aqueous solution of an alkaline inorganic compound and —COO— in the resin remaining on the surface of the 3D printed component, generating water-soluble alcohol and carboxylate salt. Through this manner, by replacing the organic solvent with the above cleaning agent for cleaning the member-to-be-cleaned or first using the cleaning agent provided in the disclosure for preliminary cleaning and then using the organic solvent for further cleaning, the use of the organic solvent is avoided or reduced, thereby improving the cleaning safety and reducing the cleaning cost.

It is to be noted that although the above cleaning agent is configured for solving the problems caused by the solvent-based resin only being cleaned by the organic solvent, in practical use, the cleaning agent is also configured for cleaning components obtained by means of printing with the waterborne resin as raw material, which is not limited in the disclosure.

In some embodiments, the inorganic cleaning agent includes, by weight percentage, 80% to 99.5% of water, 0.5% to 20% of an alkaline inorganic compound, 0% to 19.5% of a surfactant, 0% to 1% of an emulsifier, and 0% to 1% of a defoamer. While the alkaline inorganic compound and the ester produces the saponification reaction, the surfactant and the emulsifier in an alkaline cleaning agent formulation may also play a role in dissolution, emulsification, and dispersion, thereby reducing surface tension so as to remove most of the resin on the surface of the member-to-be-cleaned and improve the cleaning effect.

Specifically, the water content may be 80%, 82%, 84%, 86%, 88%, 90%, 92%, 94%, 96%, 98%, 99%, 99.5%, etc., or any value between the above adjacent content values. The content of the alkaline inorganic compound may be 0.5%, 1%, 2%, 4%, 6%, 8%, 10%, 12%, 14%, 16%, 18%, 20%, etc., or any value between the above adjacent content values. The content of the surfactant may be 0%, 1%, 3%, 5%, 7%, 9%, 11%, 13%, 15%, 17%, 19%, 19.5%, etc., or any value between the above adjacent content values. The content of the emulsifier may be 0%, 0.5%, 1.0%, etc., or any value between the above adjacent content values. The content of the defoamer may be 0%, 0.5%, 1.0%, etc., or any value between the above adjacent content values.

Specifically, taking NaOH as an example of the alkaline inorganic compound, the above saponification reaction is specifically as follows:

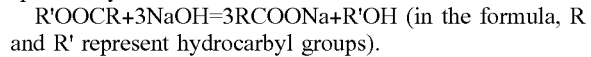

(in the formula, R and R' represent hydrocarbyl groups).

Based on the principle of the saponification reaction, the efficiency of the saponification reaction is further improved by using auxiliary methods, such as heating, thorough stirring, and adding alcohol, thereby improving the cleaning efficiency of the cleaning agent on the member-to-be-cleaned, where adding alcohol to improve the reaction efficiency is based on the principle that oil and water are immiscible, and increasing an intermediate medium can increase the reaction rate.

Specifically, emulsification is mainly achieved by the emulsifier, which can lower interfacial tension. Under hydrodynamic force, an oil film breaks up into small droplets, detaches from an interface to form an emulsion, and is carried away by water through physical scouring. At the same time, the surfactant has the functions of dispersing, suspending, and wetting a surface of a workpiece, thereby preventing the re-adsorption of grease onto the surface of the workpiece.

Further, the alkaline inorganic compound is at least one of soluble alkali, soluble alkaline salt, etc. Soluble alkali is at least one of sodium hydroxide, potassium hydroxide, etc. Soluble alkaline salt is selected from at least one of carbonate, bicarbonate, hydrogen phosphate, sulfite, acetate, sulfide, silicate, phosphate, meta-aluminate, and hypochlorite. Specifically, soluble alkaline salt refers to sodium salt and/or potassium salt, such as sodium carbonate, potassium carbonate, sodium bicarbonate, potassium bicarbonate, sodium hydrogen phosphate, potassium hydrogen phosphate, disodium hydrogen phosphate, dipotassium hydrogen phosphate, sodium sulfite, potassium sulfite, sodium acetate, potassium acetate, sodium sulfide, potassium sulfide, sodium silicate, potassium silicate, sodium phosphate, potassium phosphate, sodium meta-aluminate, potassium meta-aluminate, sodium hypochlorite, and potassium hypochlorite. The types of alkaline inorganic compounds are not limited to the above several types.

Further, the surfactant is selected from at least one of an anionic surfactant, a cationic surfactant, an amphoteric surfactant, and a nonionic surfactant, where the anionic surfactant is selected from at least one of stearic acid and dodecylbenzenesulfonic acid salt; the cationic surfactant is a quaternary ammonium compound; the amphoteric surfactant is selected from at least one of lecithin, an amino acid surfactant, and a betaine surfactant; and the nonionic surfactant is selected from at least one of alkyl glucoside and fatty acid glyceride. Commonly used anionic surfactants, cationic surfactants, amphoteric surfactants, and nonionic surfactants are within the scope of protection of the disclosure. The mentioned types of surfactants are provided as examples only.

Further, the emulsifier is an anionic emulsifier, and is specifically selected from at least one of fatty acid soap, alkyl sulfate, sodium dodecylbenzenesulfonate, and phosphate. The defoamer is a non-silicone defoamer, such as BYK-054 and BYK-057. By optimizing the composition and types of the surfactant, the emulsifier, and the defoamer, the cleaning effect on the resin is further improved, and the cleaning time is shortened.

Certainly, the above inorganic cleaning agent is configured for treating the resin on the surface of the member-to-be-cleaned not limited to the treatment methods involved in the foregoing embodiments. For example, the member-to-be-cleaned may be directly immersed in the inorganic cleaning agent to be cleaned, or the member-to-be-cleaned is also physically scrubbed by the cleaning agent.

It is to be noted that a physical motion corresponding to the term "physical scrubbing" is applied to a molded part, or the cleaning agent, or both of the molded part and the cleaning agent.

The manner of physical scrubbing includes at least one of rinsing, spraying, bubbling, brushing, centrifuging, stirring, ultrasonic processing, and swirling. It is to be understood that by using the inorganic cleaning agent in the disclosure to clean the resin on the member-to-be-cleaned and combining physical scrubbing, the cleaning effect may be significantly improved, and the cleaning time may be shortened. Under the action of physical scrubbing, the inorganic cleaning agent can exert a certain impact on a substance-to-be-cleaned, making it easier to separate matter-to-be-cleaned from the member-to-be-cleaned. Moreover, under the impact force, waste liquid obtained after cleaning by the inorganic cleaning agent may be easily taken away.

In some embodiments, the resin cleaning method of physical scrubbing is rinsing or spraying. The manner of rinsing or spraying is simple, easy to perform, and good in cleaning effect. In some embodiments, a high pressure is applied to the cleaning agent, for example, cleaning is performed by high-pressure rinsing or spraying, thereby further improving the cleaning efficiency.

In some embodiments, the inorganic cleaning agent is heated, and the heated inorganic cleaning agent is configured for cleaning the member-to-be-cleaned. Specifically, the inorganic cleaning agent is heated first, and then the heated inorganic cleaning agent is configured for cleaning. For example, the heated inorganic cleaning agent may be poured or sprayed onto the member-to-be-cleaned for cleaning. Alternatively, the inorganic cleaning agent is heated while cleaning, for example, both the inorganic cleaning agent and the member-to-be-cleaned are placed in a container with a heating function, such that heating and cleaning are performed simultaneously. Specifically, the appropriate manner is selected according to actual demands, which is not limited herein.

Specifically, when the cleaning agent is heated, the heating temperature is not limited, which is selected according to the resin material of the member-to-be-cleaned, as well as the current temperature, air pressure, etc. It is to be noted that when the heated cleaning agent is configured for cleaning the member-to-be-cleaned, firstly, the cleaning agent with a high temperature can increase the saponification and emulsification reaction rate, and reduce the surface tension; what's more, the solubility of the resin in the alkaline inorganic compound, the emulsifier, etc. may be improved, thereby increasing the concentration of the alkaline inorganic compound, the emulsifier, etc., and further improving the saponification and emulsification reaction rate; and in addition, the high temperature also reduces the viscosity of the resin. Experiments show that the viscosity of the resin decreases exponentially as the temperature increases, making it easier for the resin to separate from the surface of the member-to-be-cleaned, and especially in combination with physical scrubbing, particularly high-speed physical scrubbing, the resin is more easily scrubbed from the member-to-be-cleaned, thereby greatly reducing the difficulty of resin cleaning. Experiments show that for some resin materials, for every 20° C. increase in temperature from room temperature, the cleaning efficiency nearly increases by 1.5 times. Therefore, by using the heated cleaning agent, the efficiency of resin cleaning is significantly improved.

In some specific embodiments, the cleaning agent is heated to 20° C.-100° C., and the cleaning agent is utilized for cleaning. By introducing the heating method during cleaning, the cleaning efficiency may be further improved. Specifically, the heating temperature may be 20° C., 25° C., 30° C., 35° C., 40° C., 45° C., 50° C., 55° C., 60° C., 65° C., 70° C., 75° C., 80° C., 85° C., 90° C., 95° C., 100° C., or any value between the above adjacent temperature values.

Of course, in addition to heating the cleaning agent, the resin cleaning efficiency is also improved by adopting the manner of heating the member-to-be-cleaned to improve the temperature of resin-to-be-cleaned on the surface of the member-to-be-cleaned. A specific heating object is selected according to the actual situation, which is not limited herein.

In some specific embodiments, a plurality of auxiliary methods is also adopted, such as combined physical scrubbing and heating, thereby further enhancing the cleaning effect. The physical scrubbing and heating temperature is any of the foregoing embodiments. For example, cleaning may be performed by using a washing or spraying method, with the temperature of the inorganic cleaning agent being 40° C. to 50° C., and the cleaning time being 3 to 5 minutes during cleaning.

In some embodiments, the inorganic cleaning agent may be utilized for preliminary cleaning, and then the member-to-be-cleaned is cleaned in cooperation with the manner for re-cleaning by the organic cleaning agent.

Specifically, after the inorganic cleaning agent is utilized for cleaning the member-to-be-cleaned, the organic cleaning agent is further utilized for re-cleaning the member-to-be-cleaned. Cleaning and re-cleaning may be performed by one or multiple times; and it is performed by multiple times, a manner of a cleaning+re-cleaning loop is adopted. By adopting the manner of cleaning by the inorganic cleaning agent in conjunction with the organic cleaning agent, the cleaning effect may be further improved. Compared with the manner of only adopting the organic cleaning agent for cleaning in the related technologies, the usage amount of the organic cleaning agent may be significantly reduced, meanwhile, the cost may be reduced to a certain degree, and the safety of the cleaning process is improved.

In some embodiments, the organic cleaning agent is selected from at least one of ethyl acetate, propylene glycol methyl ether acetate, butyl acetate, alcohol, and isopropanol, which is a solvent, or a mixture of several solvents.

The resin cleaning method of using the organic cleaning agent for re-cleaning is not limited. In some embodiments, the step of utilizing the organic cleaning agent for re-cleaning the member-to-be-cleaned includes: the organic cleaning agent is utilized for performing physical scrubbing on the member-to-be-cleaned, where the manner of physical scrubbing includes at least one of rinsing, spraying, bubbling, brushing, centrifuging, stirring, ultrasonic processing, and swirling. Certainly, scrubbing may not be performed. For example, the member-to-be-cleaned cleaned by the inorganic cleaning agent may be immersed in the organic cleaning agent to be re-cleaned.

In addition to the physical scrubbing, the process of cleaning by the organic cleaning agent is also matched with methods such as heating, which is not limited herein.

Cleaning by inorganic cleaning agent cleaning (referred to as "rough cleaning") and cleaning by organic cleaning agent (referred to as "fine cleaning") may be combined with different cleaning methods, such as flushing rough cleaning+ultrasonic fine cleaning, spraying rough cleaning+ultrasonic bubbling fine cleaning, and spraying rough cleaning+spraying fine cleaning. Both the rough cleaning and fine cleaning may be performed by one or more times, that is, the rough cleaning is performed by at least one time, and the fine cleaning is performed by at least one time. By adopting the resin cleaning method, during which the member-to-be-cleaned is first cleaned to a certain cleaning level in the rough cleaning process, and then is cleaned to a required level of cleanliness in the fine cleaning process, the required level of cleanliness is achieved through cleaning within the shortest time, and the organic cleaning agent may be saved to a certain amount. In practical operations, the member-to-be-cleaned may be cleaned by the inorganic cleaning agent in a spraying or flushing manner, and then the member-to-be-cleaned is cleaned by the organic cleaning agent in the spraying or flushing manner.

In the related technologies, the cleaning waste liquid generated after cleaning the member-to-be-cleaned is often discarded directly, resulting in waste and environmental unfriendliness. In the disclosure, after the member-to-be-cleaned is cleaned by the inorganic cleaning agent and/or the organic cleaning agent, the waste liquid generated after cleaning may be further cleaned to obtain a reusable inorganic cleaning agent and/or organic cleaning agent. In the practical operation process, the waste liquid generated after cleaning is collected and then centrally treated for cleaning.

In some embodiments, the step of performing cleaning treatment on the cleaning waste liquid generated after cleaning the member-to-be-cleaned includes: cleaning treatment is performed on the cleaning waste liquid by at least one of filtering, filtering after photocuring treatment, distillation, and rectification. Specifically, treatment may be performed by adopting one of the resin cleaning methods such as filtering, filtering after photocuring treatment, distillation, and rectification, or combining the several methods.

Specifically, the cleaning waste liquid is generated after cleaning the member-to-be-cleaned by the inorganic cleaning agent, and if the waste liquid is not recycled, it is inevitable to cause a raw material waste. The inventors mainly propose the following three methods for treating the cleaning waste liquid in order to recycle the treated cleaning waste liquid, reduce the cost of waste liquid treatment, and improve the usage efficiency of cleaning liquid.

(1) Filtration

The filtration method is not limited and may adopt a filter membrane or filter cotton for filtering so as to filter out macromolecule substances from the cleaning waste liquid, and filter out color pigments and components with a high molecular weight from the waste liquid, particularly organic substances such as residual resin in the cleaning liquid. By filtering out most of these substances, the cleaning liquid is recycled to improve the cleaning efficiency of the inorganic cleaning agent.

Specifically, the material configured for filtration is selected from at least one of an ultrafiltration membrane, a nanofiltration membrane, a selectively permeable membrane, polyester fiber filter cotton, synthetic fiber filter cotton, glass fiber filter cotton, and activated carbon filter cotton. The ultrafiltration membrane is preferred so as to improve a filtration effect and more thoroughly remove macromolecule substances from the cleaning waste liquid. The inventors have discovered that reusing the inorganic cleaning agent which is obtained by filtering the used inorganic cleaning agent for cleaning the 3D printed component, a good cleaning effect can still be achieved. By recycling again, the utilization rate of raw material is improved, and the cleaning cost is reduced.

(2) Photocuring Precipitation

The cleaning waste liquid obtained after using the inorganic cleaning agent is subjected to photocuring and filtration. Photocuring utilizes the characteristics of photocurable resin, through which the cleaning waste liquid is exposed to ultraviolet light to cure uncured resin, and the cured resin is removed after filtration.

In some embodiments, the cleaning waste liquid is stirred together with ultraviolet light exposure. The simultaneous curing and stirring ensure thorough curing and formation of small particles. The cured resin is then filtered, and the remaining cleaning liquid may be reused. Certainly, stirring may not be necessary in some embodiments, which is selected according to actual situations.

Filtration and photocuring are two different treatment methods, and are selected according to different resin contents in the cleaning waste liquid. For the waste liquid with a low resin content, a photocuring precipitation and filtration method may be performed. For the waste liquid with a high resin content, filtration may be performed first to remove color pigment substances and a small amount of resin in alcohol, as complete precipitation of the resin cannot be achieved when the resin content is high, after filtration, photcuring is configured for precipitating the most of the resin.

(3) Distillation or Fractional Distillation Tower Treatment

The cleaning waste liquid is treated by a distillation or fractional distillation tower, thereby distilling cleaning liquid, removing ineffective residues, and recycling the cleaning liquid for reuse. The fractional distillation tower may also control the concentration of the distilled cleaning liquid based on an azeotropy point, thereby obtaining the cleaning liquid with a fixed concentration so as to better meet the cleaning requirements.

The inorganic cleaning agent and the related cleaning method adopted in the disclosure are further described in detail by combining embodiments below.

Members-to-be-cleaned and a cleaning effect evaluation method are described in following embodiments and experimental examples.

Figure 9:
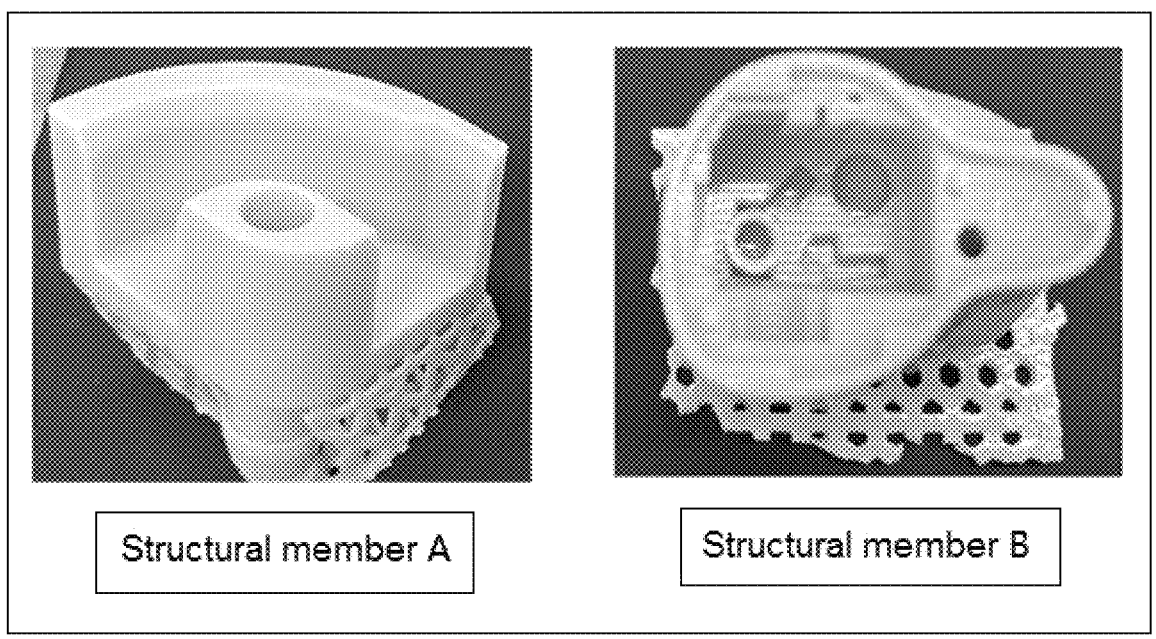
FIG. 9 is a structural schematic diagram of objects with resin to be removed according to embodiments and experimental examples of the disclosure.

HeyGears Model HP 2.0 Gray photosensitive resin (mainly composed of acrylic resin) is used to be subjected to photocuring and 3D printing through a HeyGears UltraCraft A2D device to obtain a structural member A and a structural member B as objects-to-be-cleaned. As shown in FIG. 9, the structural member A has a relatively simpler structure compared to the structural member B. Different cleaning levels are formulated based on final cleaning results:

the cleaning level 4 indicates that cleaning is thorough, the surface is free of reflection, a sample is non-sticky, and no resin remains at details, recesses, and pipelines;

the cleaning level 3 indicates no resin residue on the outer surface, only slight reflection, slight stickiness on the surface, and a minimal amount of resin residue at the details;

the cleaning level 2 indicates that most of the resin is removed from the outer surface, the surface is sticky, and more resin residues are at the details;

the cleaning level 1 indicates that thick resin accumulation on the surface may be removed, a thin layer of resin on the surface remains, and there are a large number of resin residues at the details; and the cleaning level 0 indicates that the cleaning effect is not significant, and the resin cannot be effectively removed.

Embodiment 1

This embodiment provides a cleaning method for cleaning 3D printed components, which includes the following steps:

an alkaline inorganic substance NaOH and water are mixed to prepare an alkaline solution with a mass fraction of 2% of NaOH and an alkalinity of 11.8; the alkaline solution is placed into a 70° C. constant temperature water bath; after the temperature of 70° C. is reached, the 70° C. alkaline cleaning solution is arranged into an oral irrigator; a structural member A is rinsed by the oral irrigator for 30 s, and then blow-dried by an air gun, and after the cleaning step is repeatedly performed 4 times, curing is performed; a structural member B is rinsed by the oral irrigator for 30 s, and then blow-dried by the air gun, and after the cleaning step is repeatedly performed 4 times, curing is performed.

Embodiments 2 to 4

The differences of Embodiments 2 to 4 from Embodiment 1 lie only in that the mass fraction of NaOH in the alkaline solution is respectively 4%, 6%, and 8%, and corresponding alkalinity of Embodiments 2 to 4 is respectively 12.44, 12.80, and 13.05.

Comparative Example 1

The differences from Embodiment 1 lie only in that the mass fraction of NaOH in the alkaline solution is 0%, and corresponding alkalinity is 6.5.

The test shows that the cleaning levels after cleaning the structural member A by the resin cleaning methods in Comparative Example 1 and Embodiments 1 to 4 are respectively 1, 2, 3, 4, and 4; and the cleaning levels after cleaning the structural member B by the resin cleaning methods in Comparative Example 1 and Embodiments 1 to 4 are respectively 1, 2, 2, 3, and 4.

Embodiment 5

This embodiment provides a cleaning method for cleaning 3D printed components, which includes the following steps:
an alkaline inorganic substance $NaHCO_3$ and water are mixed to prepare an alkaline solution with a mass fraction of 2% of $NaHCO_3$ and an alkalinity of 8.83; the alkaline solution is placed into a 70° C. constant temperature water bath; after the temperature of 70° C. is reached, the 70° C. alkaline cleaning solution is arranged into an oral irrigator; a structural member A for is rinsed by the oral irrigator 30 s, and then blow-dried by an air gun, and after the cleaning step is repeatedly performed 4 times, curing is performed; a structural member B for is rinsed by the oral irrigator 30 s, and then blow-dried by the air gun, and after the cleaning step is repeatedly performed 4 times, curing is performed.

Embodiments 6 to 8

The differences from Embodiment 5 lie only in that the mass fraction of $NaHCO_3$ in the alkaline solution is respectively 4%, 6%, and 8%, and corresponding alkalinity of Embodiments 2 to 4 is respectively 9.40, 9.61, and 9.85.

Comparative Example 2

The differences from Embodiment 5 lie only in that the mass fraction of $NaHCO_3$ in the alkaline solution is 0%, and corresponding alkalinity is 6.5.

The test shows that the cleaning levels after cleaning the structural member A by the resin cleaning methods in Comparative Example 2 and Embodiments 5 to 8 are respectively 1, 2, 2, 3, and 4; and the cleaning levels after cleaning the structural member B by the resin cleaning methods in Comparative Example 2 and Embodiments 5 to 8 are respectively 1, 1, 2, 2, and 3.

Based on the comparison, it may be concluded that the cleaning effect by using NaOH is slightly better than the cleaning effect by using $NaHCO_3$.

Embodiment 9

This embodiment provides a cleaning method for cleaning 3D printed components, which includes the following steps:
an alkaline inorganic substance $Na_2HPO_3$ and water are mixed to prepare an alkaline solution with a mass fraction of 2% of $Na_2HPO_3$ and an alkalinity of 8.7; the alkaline solution is placed into a 70° C. constant temperature water bath; after the temperature of 70° C. is reached, the 70° C. alkaline cleaning solution is arranged into an oral irrigator; a structural member A is rinsed by the oral irrigator for 30 s, and then blow-dried by an air gun, and after the cleaning step is repeatedly performed 4 times, curing is performed; a structural member B is rinsed by the oral irrigator for 30 s, and then blow-dried by the air gun, and after the cleaning step is repeatedly performed 4 times, curing is performed.

Embodiments 10 to 12

The differences from Embodiment 5 lie only in that the mass fraction of $Na_2HPO_3$ in the alkaline solution is respectively 4%, 6%, and 8%, and corresponding alkalinity of Embodiments 2 to 4 is respectively 9.33, 9.70, and 9.91.

Comparative Example 3

The differences from Embodiment 9 lie only in that the mass fraction of $Na_2HPO_3$ in the alkaline solution is 0%, and corresponding alkalinity is 6.5.

The test shows that the cleaning levels after cleaning the structural member A by the resin cleaning methods in Comparative Example 3 and Embodiments 9 to 12 are respectively 1, 2, 2, 3, and 4; and the cleaning levels after cleaning the structural member B by the resin cleaning methods in Comparative Example 2 and Embodiments 5 to 8 are respectively 1, 1, 2, 2, and 3.

Based on the comparison, it may be concluded that the cleaning effects by using $Na_2HPO_3$ and $NaHCO_3$ are roughly the same, and are both inferior to the cleaning effect by using NaOH.

Based on the above embodiments and comparative examples, it may be concluded that under other consistent conditions, an alkaline solvent thoroughly cleans resin-sticky structural members. In addition, a higher proportion of the alkaline solvent leads to higher cleaning efficiency.

Embodiment 13

This embodiment provides a cleaning method for cleaning 3D printed components, which includes the following steps:
an alkaline substance NaOH is selected and mixed with water to prepare a solution with a mass percentage of 6% NaOH; under the solvent temperature of 25° C., a structural member A is rinsed by an oral irrigator for 30 s; and then blow-dried by an air gun; and the cleaning step is repeatedly performed, and the cleaning time is 10 min in the case of achieving the cleaning level 4 in the test.

Embodiments 14 to 16

The differences from Embodiment 13 lie only in that the solvent temperature is respectively 40° C., 50° C., and 70° C.; and the cleaning time is respectively 4 min, 3 min, and 2 min in the case of achieving the cleaning level 4 in the test in Embodiments 14 to 16.

By comparing Embodiments 13 to 16, it may be concluded that under other consistent conditions, a higher temperature of the alkaline solvent leads to higher cleaning efficiency.

Embodiment 17 (Impact of Alkaline Cleaning Solution Recovery and Filtration on Cleaning Efficiency)

This embodiment provides a cleaning method for cleaning 3D printed components, which includes the following steps:
an alkaline substance NaOH is selected and mixed with water to prepare a solution with a mass percentage of 6% of NaOH; the solution is placed into a 70° C. constant temperature water bath; after the temperature of 70° C. is reached, the 70° C. alkaline cleaning solution is arranged into an oral irrigator; a structural member A is rinsed by the oral irrigator for 30 s, and then blow-dried by an air gun, and after the cleaning step is repeatedly performed 4 times, curing is performed; a structural member B is rinsed by the oral irrigator for 30 s, and then blow-dried by the air gun, and after the cleaning step is repeatedly performed 4 times, curing is performed, and the obtained cleaning levels are respectively 4 and 3.

Half of the above cleaning waste liquid is taken to be repeatedly subjected to the normal cleaning liquid cleaning step and cured, and the obtained cleaning levels are respectively 3 and 2; the other half is filtered by an ultrafiltration membrane to obtain a first filtered NaOH recovery solution (pH 13.02), the normal cleaning liquid cleaning step is repeatedly performed, curing is performed, and the obtained cleaning levels are respectively 4 and 3; and the cleaning waste liquid is repeatedly taken to be filtered to obtain a second filtered NaOH solution (pH 12.96) and a third filtered NaOH solution (pH 12.93), the normal cleaning liquid cleaning step is repeatedly performed, curing is performed, and the obtained cleaning levels are respectively 4 and 3, and 4 and 3 respectively.

The experimental results indicate that by using the ultrafiltration membrane for filtration, the cleaning capability of an alkaline cleaning agent may be restored to a great degree.

Embodiment 18

This embodiment provides a cleaning method for cleaning 3D printed components, which includes the following steps:
an alkaline substance NaOH is selected and mixed with water to prepare a solution with a mass percentage of 6% of NaOH; the solution is placed into a 70° C. constant temperature water bath; after the temperature of 70° C. is reached, the 70° C. alkaline cleaning solution is transferred into an ultrasonic machine for ultrasonic rough cleaning of a structural member A and a structural member B for 5 min, followed by blowing-dry; the solution is replaced with a fresh 70° C. alkaline cleaning solution, ultrasonic fine cleaning continues to be performed for 20 min, blowing-dry and curing are performed, and the obtained cleaning levels are respectively 2 and 1.

Embodiment 19

The difference from Embodiment 18 lies only in that the resin cleaning methods are different, specifically as below:
an alkaline substance NaOH is selected and mixed with water to prepare a solution with a mass percentage of 6% of NaOH; the solution is placed into a 70° C. constant temperature water bath; after the temperature of 70° C. is reached, the 70° C. alkaline cleaning solution is transferred into an ultrasonic machine; a bubbling device is additionally arranged at a bottom of a container, and ultrasonic+bubbling rough cleaning is performed on a structural member A and a structural member B for 5 min, followed by blowing-dry; and the solution is replaced with a fresh 70° C. alkaline cleaning solution, ultrasonic+bubbling fine cleaning continues to be performed for 20 min, followed by blowing-dry and curing, and the obtained cleaning levels are respectively 4 and 3.

Based on Embodiment 17, it is concluded that by rinsing the structural member A and the structural member B for 2 min by an oral irrigator filled with the 70° C. alkaline cleaning solution, the cleaning levels of 4 and 3 are achieved. However, in Embodiments 18 and 19, the cleaning levels of 2 and 1 are achieved after 5 min ultrasonic rough cleaning+20 min fine cleaning, and the cleaning levels of 4 and 3 are achieved after 5 min ultrasonic bubbling rough cleaning+20 min fine cleaning. The above indicates that for the same alkaline cleaning solution, the efficiency of cleaning varies in different cleaning methods.

Embodiment 20

This embodiment provides a cleaning method for cleaning 3D printed components, which includes the following steps:
(1) An alkaline substance NaOH is selected and mixed with water to prepare a solution with a mass percentage of 6% of NaOH; the solution is placed into a 50° C. constant temperature water bath; after the temperature of 50° C. is reached, a 50° C. alkaline cleaning solution is arranged into an oral irrigator; a structural member A is rinsed by the oral irrigator for 30 s, and then blow-dried by an air gun, and after the cleaning step is repeatedly performed 4 times, the obtained cleaning level is 3; a structural member B is rinsed by the oral irrigator for 30 s, and then blow-dried by the air gun, and after the cleaning step is repeatedly performed 4 times, the obtained cleaning level is 2.
(2) The cleaned structural member A and the cleaned structural member B are placed in a container filled with 99% isopropanol to be subjected to ultrasonic cleaning for 30 s, followed by blowing-dry and curing, and the obtained cleaning levels are both 4.

Comparative Example 4

This comparative example provides a cleaning method for cleaning 3D printed components, which includes the following steps:
an uncleaned structural member A and an uncleaned structural member B are placed in a container filled with 99% isopropanol to be subjected to ultrasonic cleaning for 90 s, and then are blown dry, and the obtained cleaning levels are respectively 3 and 2; and the cleaned structural member A and the cleaned structural member B are placed in the container filled with 99% isopropanol to be subjected to ultrasonic cleaning for 30 s, followed by blowing-dry and curing, and the obtained cleaning levels are both 4.

Based on Embodiment 20 and Comparative Example 4, it is concluded that the rough cleaning+fine cleaning test adopting the alkaline cleaning solution and the organic solvent can completely achieve the cleaning effect of rough cleaning+fine cleaning by the organic solvent, which has the only defect that the cleaning time is slightly prolonged. The manner of rough cleaning+fine cleaning adopting the alkaline cleaning solution and the organic solvent may effectively reduce the usage amount of the organic solvent, reduce the cost, and improve the cleaning safety.

Embodiments 21 to 26

This embodiment provides a cleaning method for cleaning 3D printed components, which includes the following steps:
HeyGears Model HP 2.0 Gray photosensitive resin is used to be subjected to photocuring and 3D printing through a HeyGears UltraCraft A2D device to obtain a C-shaped dental cast as a test-model-to-be-cleaned; an alkaline substance NaOH is selected and mixed with water to prepare a solution with a mass percentage of 6% of NaOH; and the dental cast is respectively tested through oral irrigator rinsing and ultrasonic cleaning at the solvent temperatures of 40° C., 50° C., and 70° C., and cleaning accuracy reverse scanning data is shown in Table 1:

TABLE 1

Cleaning accuracy reverse scanning data at different cleaning temperatures and cleaning methods

| Group | Temperature | Cleaning method | Cleaning solvent | Cleaning time 0 min | Cleaning time 2 min | Cleaning time 3 min | Cleaning time 5 min | Cleaning time 10 min |
|---|---|---|---|---|---|---|---|---|
| Embodiment 21 | 40° C. | Ultrasonic | NaOH (6%) | 100% | 99.15% | 96.99% | 96.52% | 99.36% |
| Embodiment 22 | 40° C. | Rinse |  | 100% | 98.63% | 95.83% | 99.04% | 95.79% |
| Embodiment 23 | 50° C. | Ultrasonic |  | 100% | 88.42% | 78.15% | 58.47% | 48.16% |
| Embodiment 24 | 50° C. | Rinse |  | 100% | 92.13% | 85.31% | 57.93% | 52.59% |
| Embodiment 25 | 70° C. | Ultrasonic |  | 100% | 54.52% | 54.23% | 51.55% | 56.13% |
| Embodiment 26 | 70° C. | Rinse |  | 100% | 43.72% | 50.29% | 49.42% | 49.42% |

The reverse scanning data in the table is obtained through comparison with a standard isopropanol cleaning process for cleaning the C-shaped dental cast.

Based on the data in the table, it is concluded that the main factor affecting the model accuracy by the alkaline cleaning solution is thermal deformation. The cleaning temperature, the resin cleaning method, and the duration is selected based on the thermal deformation temperature of the resin and the acceptable degree of thermal deformation.

Embodiment 27

The effect of organic cleaning agent recovery and filtration on cleaning efficiency is studied by the following specific method and test results:

Four samples of isopropanol cleaning agents are selected. One sample is clean and is labeled as a cleaning agent B. The other three samples have already adopted to clean structural members with the cleaning capacity reaching saturation, wherein one sample is taken and labeled as a cleaning agent C, and one of the remaining two samples of cleaning agents is filtered by an ultrafiltration membrane to obtain a cleaning agent D, another of the remaining two samples of cleaning agents is filtered by photocuring in conjunction with the ultrafiltration membrane to obtain a cleaning agent F; the structural members are respectively cleaned by the four cleaning agents, and thorough cleaning is rated as a level 4 cleaning level, where the cleaning agent B thoroughly cleans 16 structural members, the cleaning agent C fails in thorough cleaning of any structural member, the cleaning agent D thoroughly cleans 10 structural members, and the cleaning agent F thoroughly cleans 12 structural members.

It may be concluded that the cleaning agent capabilities are in the order of cleaning agent B>cleaning agent F>cleaning agent D>cleaning Agent C. The above tests demonstrate that filtration using the ultrafiltration membrane improves the cleaning capability of resin-containing cleaning agents to some extent. Photocuring in conjunction with ultrafiltration membrane filtration further improves the cleaning capability of the resin-containing cleaning agents.

The above embodiments are merely preferred embodiments of the disclosure, and are not intended to limit the disclosure. For those skilled in the art, the disclosure may have various modifications and changes. Any modification, equivalent replacement, improvement, etc. made within the spirit and the principle of the disclosure shall fall within the scope of protection of the disclosure.

INDUSTRIAL APPLICABILITY

The disclosure provides the cleaning agent, cleaning method, and cleaning machine 10 for cleaning 3D printed components. The alkaline inorganic compound is used as a main raw material of the cleaning agent. The alkaline inorganic compound and ester may undergo saponification reaction, generating alcohol and carboxylate salt that are soluble in water, thereby achieving the cleaning purpose. By adopting the cleaning agent provided in the disclosure, the use of conventional cleaning agent such as alcohol or isopropanol may be reduced or directly eliminated, thereby reducing the cost, and irritability of the cleaning agent. Meanwhile, the use of flammable and explosive organic solvent such as alcohol is reduced, thereby improving the operation safety during usage and storage of the cleaning agent. The cleaning agent is suitable for being used in industrial production and has excellent industrial application prospects.

The above embodiments are merely preferred embodiments of the disclosure, and are not intended to limit the disclosure. For those skilled in the art, the disclosure may have various modifications and changes. Any modification, equivalent replacement, improvement, etc. made within the spirit and the principle of the disclosure shall fall within the scope of protection of the disclosure.

What is claimed is:

1. A resin cleaning device, comprising:
    a control system;
    a treatment unit, which is in communication connection with the control system and is configured for treating a member-to-be-cleaned so as to reduce a viscosity of resin on the member-to-be-cleaned;
    a driving unit, which is in communication connection with the control system and is configured for driving the member-to-be-cleaned to rotate; and
    a feedback assembly, which is in communication connection with the control system and is configured for acquiring a position signal of the member-to-be-cleaned and feeding the position signal back to the control system, such that the control system controls the treatment unit and the driving unit according to the position signal;
    wherein the feedback assembly comprises:
    a sensing element, which is in communication connection with the control system and has a trigger station; and
    a trigger element, which is connected with the driving unit, and is driven by the driving unit to rotate relative to the sensing element,
    wherein when the trigger element rotates to the trigger station, the sensing element feeds the position signal back to the control system.

2. The resin cleaning device according to claim 1, wherein the treatment unit comprises:
    an accommodating chamber, configured for accommodating the member-to-be-cleaned; and a viscosity reduction mechanism, which is in communication connection with the control system, is at least partially located in the accommodating chamber, and is arranged towards the member-to-be-cleaned when the trigger element is located at the trigger station, such that an operation of reducing the viscosity of the resin on the member-to-be-cleaned is performed under control of the control system.

3. The resin cleaning device according to claim 2, wherein the viscosity reduction mechanism comprises at least one of a nozzle for spraying a solvent, a heating element for heating the member-to-be-cleaned, and a vacuum pump for creating a vacuum state for the member-to-be-cleaned.

4. The resin cleaning device according to claim 2, wherein the viscosity reduction mechanism comprises:
 a guide rail, arranged on a side wall of the accommodating chamber;
 a slider, connected with the guide rail and slidably arranged along the guide rail;
 a hinge, connected with the slider and slidably arranged along the guide rail together with the slider; and
 a nozzle, arranged on the hinge and configured for spraying a cleaning agent.

5. The resin cleaning device according to claim 2, further comprising a collection unit, wherein the collection unit is communicated with an accommodating chamber, and is configured for collecting a waste liquid in the accommodating chamber.

6. The resin cleaning device according to claim 1, further comprising an identification reading mechanism, configured to identify an identification associated with the member-to-be-cleaned.

7. The resin cleaning device according to claim 1, wherein the control system is configured to control the driving unit to drive the member-to-be-cleaned to rotate during a first time period, and to control the treatment unit to process the member-to-be-cleaned during a second time period following the first time period.

* * * * *